United States Patent
Kisilev (10) Patent No.: US 9,098,897 B2
(45) Date of Patent: Aug. 4, 2015

(54) DETECTION OF SCRATCHES ON AN IMAGE

(75) Inventor: Pavel Kisilev, Maalot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 14/008,546

(22) PCT Filed: Mar. 29, 2011

(86) PCT No.: PCT/US2011/030339
§ 371 (c)(1),
(2), (4) Date: Sep. 28, 2013

(87) PCT Pub. No.: WO2012/134451
PCT Pub. Date: Oct. 4, 2012

(65) Prior Publication Data
US 2014/0023244 A1    Jan. 23, 2014

(51) Int. Cl.
*G06K 9/00* (2006.01)
*G06T 7/00* (2006.01)
*H04N 1/00* (2006.01)
*H04N 1/409* (2006.01)

(52) U.S. Cl.
CPC ............ *G06T 7/001* (2013.01); *H04N 1/00092* (2013.01); *H04N 1/4097* (2013.01)

(58) Field of Classification Search
CPC .. G06T 7/001; H04N 1/00092; H04N 1/4097; F17D 3/00
See application file for complete search history.

(56) References Cited

U.S. PATENT DOCUMENTS

| | | | |
|---|---|---|---|
| 6,366,358 B1 | 4/2002 | Satou et al. |
| 6,570,607 B1 | 5/2003 | Fujita |
| 7,090,324 B2 | 8/2006 | Mizes |

(Continued)

FOREIGN PATENT DOCUMENTS

| | | |
|---|---|---|
| JP | H07-249099 | 9/1995 |
| JP | 2001-105698 | 4/2001 |

(Continued)

OTHER PUBLICATIONS

Yasuhiro Kazama, et al., "Detection and Removal of Line Scratches in Film Sequences Using Intensity Projection", 22nd Wksp on Circuits and Systems in Karuizawa, Apr. 20-21, 2009, Japan, p. 420-425.

(Continued)

*Primary Examiner* — Tom Y Lu
(74) *Attorney, Agent, or Firm* — Mark S. Cohen (57) ABSTRACT

A method for detecting a scratch on a printed image is disclosed, which may include obtaining a digital representation of the printed image and a digital reference image. The method may also include summing values of pixels of pixel lines in at least one segment of the digital representation of the printed image along a suspected direction to obtain a projection signal of the digital representation of the printed image for that segment, and summing values of pixels in a corresponding at least one segment of the digital reference image in the suspected direction to obtain a projection signal of the reference image for the corresponding segment. The method may further include comparing the projection signals to detect dissimilarity indicative of a directional coherence in the suspected direction due to a scratch in the segment of the digital representation of the printed image. Non-transitory computer readable medium and system are also disclosed.

20 Claims, 5 Drawing Sheets

(56) References Cited

U.S. PATENT DOCUMENTS

| | | |
|---|---|---|
| 7,570,788 B2 * | 8/2009 | Tsukamoto et al. .......... 382/112 |
| 7,630,068 B2 | 12/2009 | Tanaka et al. |
| 2003/0053158 A1 | 3/2003 | Tsuji |
| 2006/0114520 A1 | 6/2006 | Enomoto et al. |
| 2006/0158703 A1 * | 7/2006 | Kisilev et al. ................ 358/504 |
| 2007/0047801 A1 | 3/2007 | Kojima et al. |
| 2008/0013848 A1 | 1/2008 | Wu et al. |
| 2009/0091780 A1 | 4/2009 | Takemoto et al. |
| 2010/0238462 A1 | 9/2010 | Reitz et al. |

FOREIGN PATENT DOCUMENTS

| | | |
|---|---|---|
| JP | 2003-094594 | 4/2003 |
| JP | 2005-049212 | 2/2005 |
| JP | 2006-138768 | 6/2006 |
| JP | 2007-033247 | 2/2007 |
| JP | 2007-152700 | 6/2007 |
| JP | 2008-096206 | 4/2008 |
| WO | 2008066055 A1 | 6/2008 |

OTHER PUBLICATIONS

P. Kisilev et al., "Noise and signal activity maps for better imaging algorithms," Proceedings of ICIP, 2007 (year).

"QuadTech Acquires Gigitek" web page, http://www.graphicrepro.co.za, May 7, 2008.

International Search Report and Written Opinion in PCT counterpart patent application, PCT/US2011/030339, dated Nov. 21, 2011.

* cited by examiner

DETECTION OF SCRATCHES ON AN IMAGE

BACKGROUND

A printed image may sometimes include various printing defects. Printing defects may be the result of various reasons, such as, for example, malfunctioning printing gear (e.g. ink spots due to spattering nozzles of a desktop ink printer, stains due to undesired electromagnetic field in large ink printers), dirt (e.g. a paper strip or other dirt that may get stuck onto a printer drum) or mechanical or physical obstructions (e.g. debris in printer preventing proper function of the printer, or displacement of parts of the printer that cause the printer to work improperly). The resulting printing defects may occur globally on the entire printed page or locally in one or more regions, and may have various shapes, such as spots, spatters or scratches.

General purpose print defect detection methods are targeting defects of various types, shapes and sizes. They are usually designed without considering defect-specific characteristics, and their detection ability relies solely on the contrast of a defect with respect to its neighboring area. Such detection methods may fail to detect scratches. Scratches may be difficult to detect because of their very low contrast with respect to the background, which may itself be textured or noisy, and their small width, and because they may possess similar characteristics of image features such as lines, and are, therefore, easily confused with lines.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It should be noted that the figures are given as examples only and in no way limit the scope of the invention. Like components are denoted by like reference numerals.

DETAILED DESCRIPTION

Scratches may generally be characterized as being elongated, very thin formations. In many instances scratches are hard to distinguish from their surrounding background because of low contrast. The surrounding background itself may sometimes be textured or noisy. In other words, scratches may possess very low signal-to-noise ration (SNR) making detection even more challenging. Additionally, scratches nay look very similar to valid image features, such as lines, edges, and may appear across an entire printed page, or across a segment or segments of the page.

The specific characteristic of scratches may lend itself to facilitate their detection. In particular, in accordance with embodiments of the present invention, it is suggested to exploit the fact that scratches may be characterized as possessing directional coherence.

An "image" in the context of the present invention is understood in its broadest scope, so as to include any image representation, such as, for example, a graphical image (e.g. a photograph), a vector-graphics image (e.g. graphics), textual graphics etc.

A "print of an image", or "printed image", in the context of the present invention, is understood to refer to any reproduction, reconstruction or copy of the image, whether produced by a printer or by other reproduction, reconstruction or copying device or method (hereinafter referred to as "printer device" and "printing method").

Reference is made to the accompanying figures.

Figure 1:
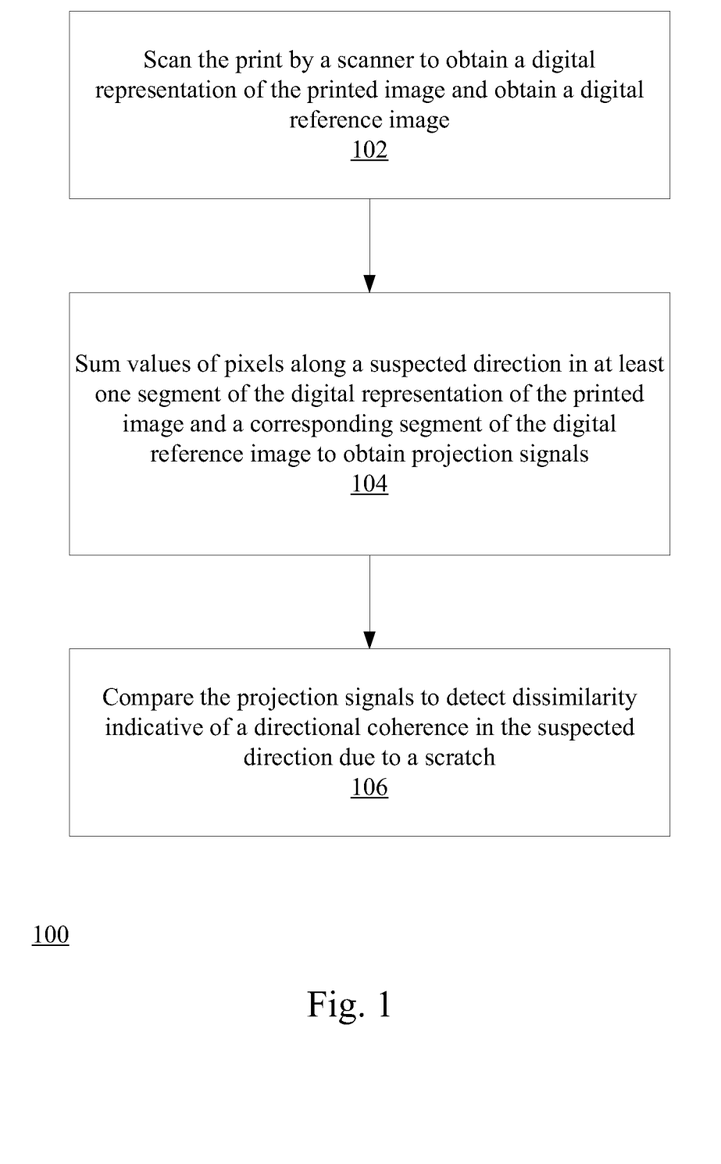
FIG. 1 illustrates a method for detecting a scratch on a printed image, in accordance with an embodiment of the present invention.

FIG. 1 illustrates a method for detecting a scratch on a printed image, in accordance with an embodiment of the present invention.

A method 100 for detecting a scratch on a printed image, in accordance with embodiments of the present invention may include: obtaining 102 a digital representation of the printed image and a digital reference image. The method may also include summing 104 values of pixels along a suspected direction in at least one segment of the digital representation of the image and in a corresponding segment of the digital reference image to obtain projection signals (a two-dimensional matrix of pixel values is projected, by summing the pixels in the suspected direction, to a one-dimensional projection signal). The method may further include comparing 106 the projection signals to detect dissimilarity indicative of a directional coherence in the suspected direction due to a scratch.

It is asserted that working with projection signals may significantly reduce computational burden which yields faster performance and efficient utilization of resources.

For brevity the digital representation of the scanned image is called hereinafter "the printed image", while the digital reference of the image is referred to as "the reference image".

The summation of pixels in a particular direction (the suspected direction) is directed at increasing the detectability of a defect having a directional coherence by increasing its "contrast" with respect to the surrounding background by projecting a matrix of pixels in the suspected direction.

In some embodiments of the present invention, the summation may include summing values of all of the pixel in the said at least one segment in the suspected direction (i.e. all adjacent pixels). In other embodiments of the present invention, the method may include summing pixel values of just some pixel lines in the said at least one segment in the suspected direction (e.g. choosing pixel lines for every other pixel, or every nth pixel, n being an integer). By "summing lines" is meant, in the context of the present invention, summing all pixels that are found along a line in the suspected direction within the segment. The summing of the pixel lines may be in some embodiments of the present invention summing pixels in adjacent lines, and, in other embodiments of the present invention, summing of separated pixel lines.

In some embodiments of the present invention a multi-scale approach may be used, where in order to detect scratches of different widths, the process is repeated several times, each time summing pixel lines of different distributions, e.g., summing of every nth pixel line, for a different n (e.g. n being an integer). This may be done to cause thicker scratches to appear as peaks instead of broad steps on the intensity projection signal, and thus eliminate the need to look for steps when examining the intensity projection signal, which may also relate to valid features in the scanned image.

The suspected direction may be in many instances the X or Y axis of the image or a direction about these axes. If the scratch is caused by a mechanical fault of the printer it is very likely that its direction be correlated with the direction of the moving print head (which in ink printers is, in many printer models, across the width of the printed page, or the X axis), or correlated with the direction of the advance of the printed page.

In other instances where the scratch is a result of dirt or an external obstacle, the scratch direction may be diagonal with respect to the printed page (e.g. in a variety of angles).

In simple cases, where the printed image contains a single grey level or a few distinct grey levels (a "few" in the context of the present invention refers to a limited number of distinct grey levels, for example no more than 2-10 different grey levels).

In cases where the printed image includes more details than just a single block of grey level or several distinct grey levels blocks (e.g. a photograph or other detailed graphical element), a digital reference may be used.

It is noted that even if the printed image does not contain any defects, it may be different (sometimes even significantly different) from the reference image due to scanning process artifacts. In particular, the scanned printed image may be stretched, shifted, rotated or subjected to a combination of the above, with respect to the reference image. Furthermore, a scanned image of printed halftone image may reveal typical textures that do not appear in the original image. Therefore, defect detection may be directed at disregarding dissimilarities that are not related to defects in print.

Figure 2:
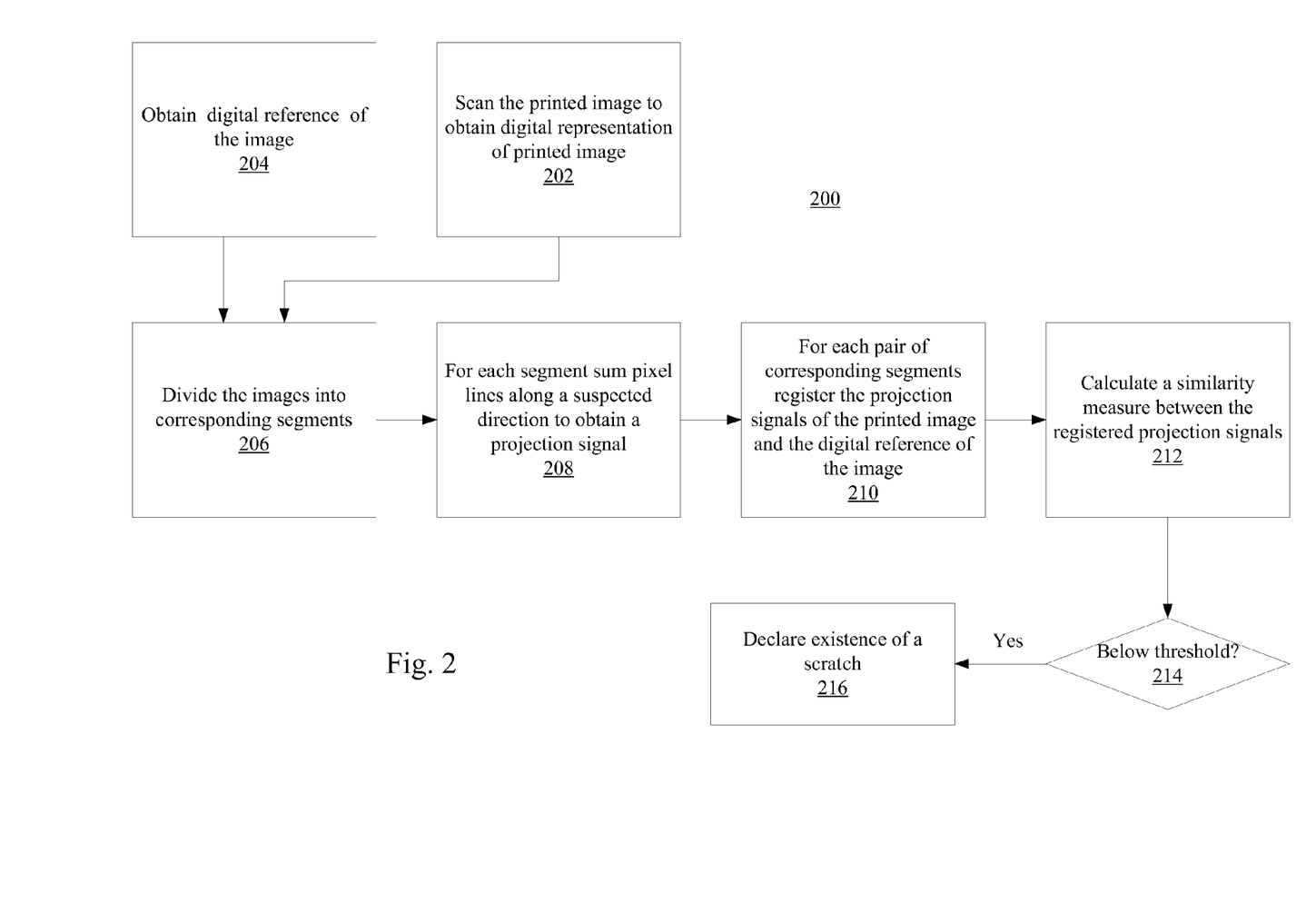
FIG. 2 illustrates a process for detecting a scratch on a printed image, in accordance with an embodiment of the present invention.

FIG. 2 illustrates a process 200 for detecting a scratch on a printed image, in accordance with an embodiment of the present invention.

A printed image may be scanned 202 to obtain a digital representation of the printed image. A digital reference of the image may also be obtained 204.

The digital reference may be, for example, the digital image that was sent to be printed onto the examined print. In the case where the printed image contains a single grey-level or a few grey levels (e.g. a test print for diagnosis purposes, such as printed by print diagnosis tools used to test the printing performance of the printer), the reference image will simply be a single grey-level image, or an image with a few grey-levels.

The following operations are carried out both on the digital representation of the scanned image and on the digital reference of the image. Both the printed image and the reference image may be divided 206 into corresponding segments. The segment size may be fixed or chosen adaptively (automatically or user determined). Working on segments is supposed to reduce the risk of failing to detect short scratches when considering the entire image due to its (relatively) small contribution to the overall projection signal. In some embodiments of the present invention only a pair of corresponding sections of the images may be segmented (or treated as a single segment), whereas in other embodiments most of the area of the images, or all of it, may be segmented.

For each segment pixel lines are summed 208 along a suspected direction to obtain a projection signal. The projection signals of the image on print and the digital reference of the image are registered 210 to align the projection signals.

The registered signals of each pair of corresponding segments (of the printed image and the reference image) are compared by calculating 212 a similarity measure between the projection signals. It is then determined 214 whether the value of similarity measure is below a predetermined threshold (indicating dissimilarity), and if it is below that threshold the existence of a scratch in the printed image is declared 216.

Figure 3:
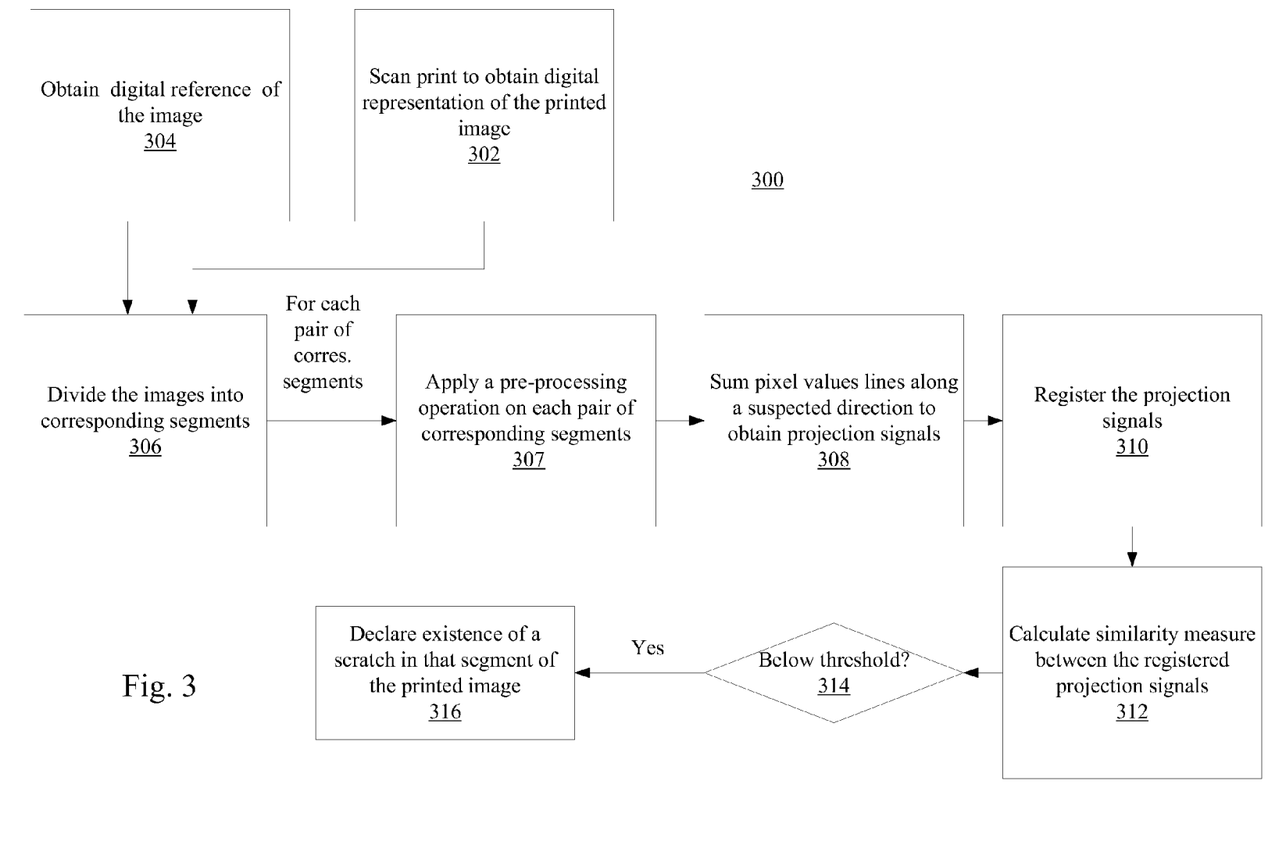
FIG. 3 illustrates a process for detecting a scratch on a printed image, in accordance with another embodiment of the present invention.

FIG. 3 illustrates a process 300 for detecting a scratch on a printed image, in accordance with another embodiment of the present invention.

In Process 300, a printed image may be scanned 302 to obtain a digital representation of that image. A digital reference of the image may also be obtained 304.

The printed image and the reference image may then be divided 306 into a plurality of corresponding segments. Again, the size of the segments may be fixed or adaptively determined. In some embodiments of the present invention only corresponding sections of the images may be segmented (or treated as a single segment), whereas in other embodiments most of the area of the images, or all of it, may be segmented.

Each pair of corresponding segments (a segment of the printed image and its corresponding segment of the reference image) may be subjected 307 to a pre-processing operation designed to increase the detectability of a scratch, if it exists in the examined segment (of the printed image) achieving relative invariance to the contrast of defects, and thus allowing detection of low contrast defects.

For example, a preprocessing operation may be selected from the following preprocessing operations: reducing noise, increasing contrast, transforming the pair of corresponding segments a different domain (such as for example applying a Fourier transform on the corresponding segments). Further example of a preprocessing operation may be an extremum filter which may be used on each segment of pairs of corresponding segments, which assignes, to each pixel of the segment, the value of the pixel in neighborhood to that pixel with the highest value (when the filter is a maximum filter, or the lowest value, if the filter is a minimum filter). "Neighborhood" may refer, for example, to the surrounding pixels in immediate proximity (e.g. the block of 3×3 pixels in which the central pixel is the pixel treated by the filter). In other instances a block of n×n neighboring pixels (n being greater than 3) may be considered.

In other embodiments of the present invention a variation of extremum filter may be used which assigns the value of 1 to the pixels of greatest value (in a maximum filter, or lowest value in a minimum filter) in a neighboring block and 0 to the other pixels of that block.

Then, for each detected segment and its corresponding segment in the digital reference pixel values of pixel lines may be summed 308 along a suspected direction to obtain projection signals. The projection signals of the printed image and the reference image may be then registered 310 to align the signals. A similarity measure between the projection signals may be then calculated 312, and compared to a predetermined threshold 314, if the similarity measure is found to be below that threshold, the existence of a scratch may be declared 316.

For example, the similarity measure (e.g. kurtosis) may be based on a notion of sparsity. The number of spikes in each of the projection signals may be counted and compared, so that a different between the number of spikes in the projection signal of the segment of the printed image and the number of spikes in the projection signal of the corresponding segment of the digital reference may indicate the existence of a scratch.

The threshold value may be set to be proportional to the activity in the corresponding segment in the reference image. It may also be measured using a noise estimation approach. Choosing a proper threshold may effectively reduce the number of false detections of intrinsic image features such as line segments and various edges.

Figure 4:
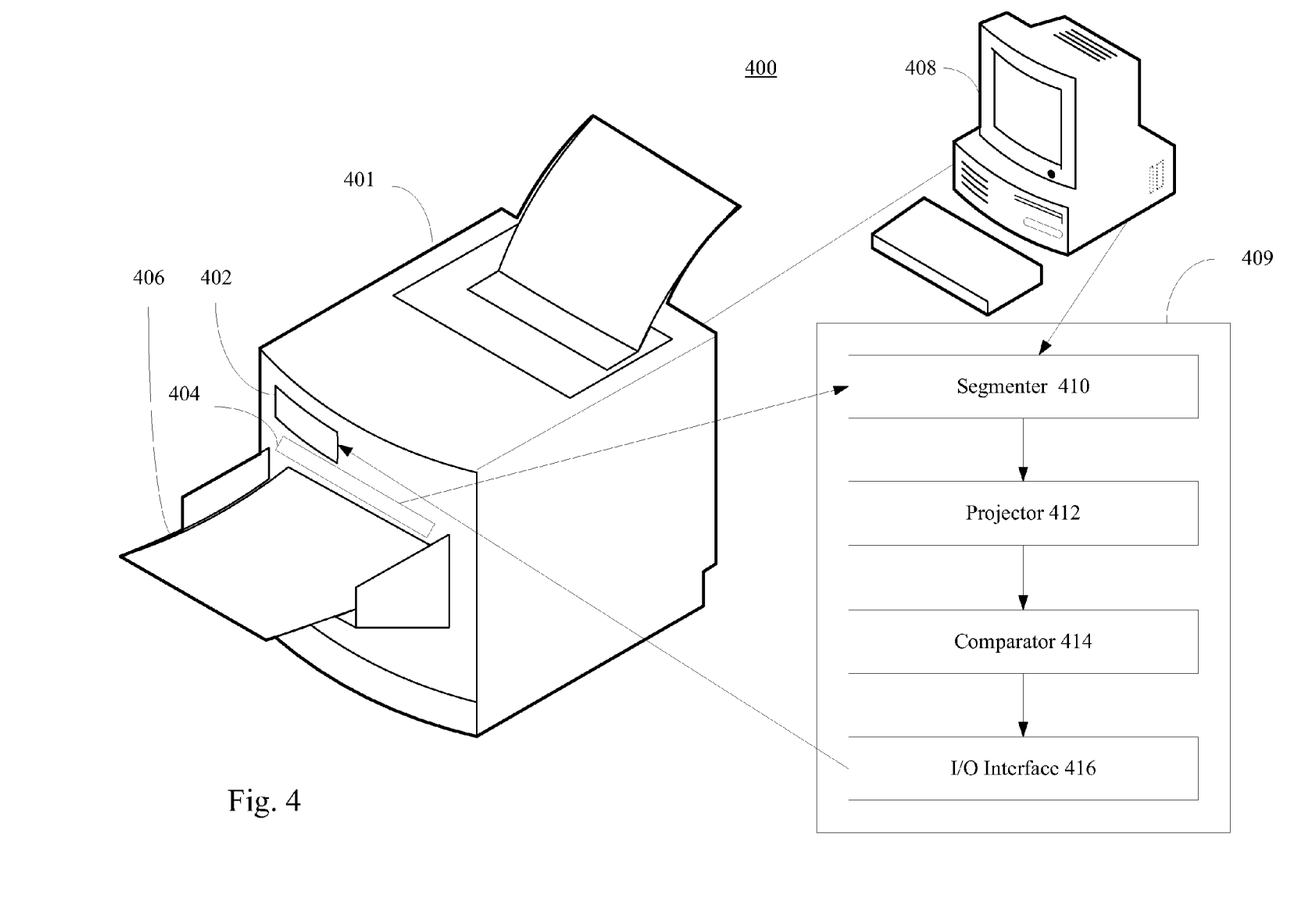
FIG. 4 illustrates a system for detecting a scratch on a printed image, in accordance with an embodiment of the present invention, incorporated in a printer.

FIG. 4 illustrates a system for detecting a scratch on a printed image, in accordance with an embodiment of the present invention, incorporated in a printer.

The system 400 may include a server or a user, e.g. personal computer (PC) 408, linked to printer 401. For example, printer 401 may be an inkjet printer, a laser printer, a plotter, dot-matrix printer or a thermal printer, or a press. Printer 401 may be a small portable printer for printing on the road, a home desktop printer for personal printing jobs, an office printer for business printing tasks or an industrial printer for printing jobs on a large scale (e.g. screen printing, digital printing, label printing, offset printing, letterpress printing, and flexographic printing).

Printer 401 may include scanner 404 for scanning a print 406 generated by the printer. In other embodiments of the present invention a separate scanner may be used, which is not incorporated in printer 401. The scanner may be selected, for example, from the group of scanners including in-line scanners, flatbed scanners, photoscanners, sheet-fed scanners, handheld scanners and portable scanners.

Scanner 404 is linked to scratch detector 409, which may include segmenter 410, configured to divide the scanned printed image received from the scanner as well a reference image received from PC 408 (e.g. the same image that was sent to print on printer 401) into corresponding segments. Scratch detector 409 may also include projector 412 for projecting pixel lines in a suspected direction for each segment (both of the printed image and the reference image) to obtain a projection signals for corresponding segments. Comparator 414 may be included, for comparing between the projection signals of pairs of corresponding segments of the printed image and the reference image. Scratch detector 409 may also include Input/Output (I/O) interface 416, for example for issuing a visual scratch detection alert which may be displayed on display 402 which may be included in printer 401 or on another display. The detection alert may be provided, for example, in the form of an audio alert, video alert or a combination of both.

A scratch detector in accordance with embodiments of the present invention may be realized in hardware, in software or in a combination of both. It may be incorporated in a printer (be it a desktop printer for home printing applications, a larger printer for business applications or even in large industrial printers. Alternatively, a scratch detector, in accordance with some embodiments of the present invention may be realized as a separate device, or incorporated in a computing device connected to a printer (e.g. a PC, a server, etc.).

Figure 5A:
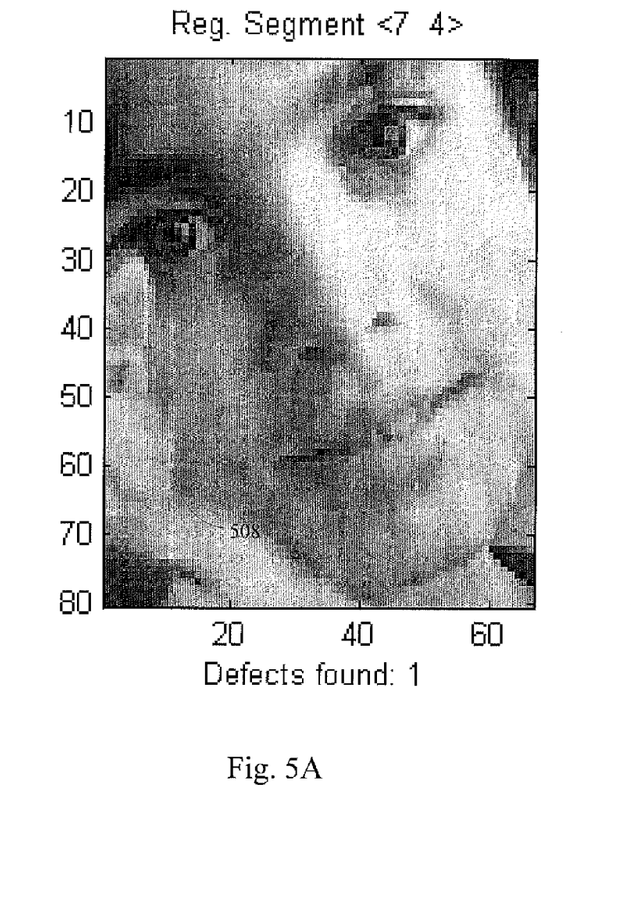
FIG. 5A shows a segment of a printed image.
Figure 5B:
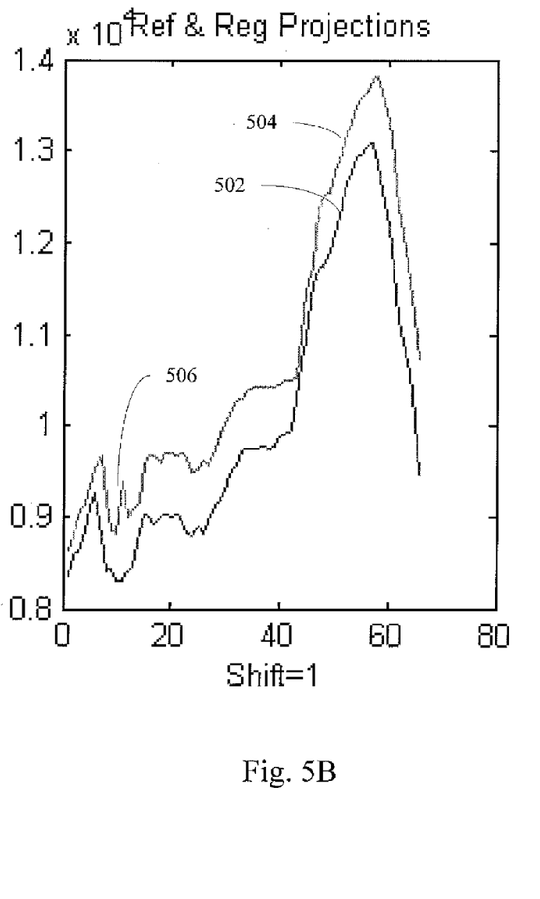
FIG. 5B is a chart showing a projection signal of the segment of the printed image shown in FIG. 5A and a projection signal of the corresponding segment of a reference image, in accordance with embodiments of the present invention.

In order to appreciate some aspects of the present invention reference is made to FIG. 5A and FIG. 5B.

FIG. 5A is a segment of a printed image (a photograph) of a young person's face. The vertical and horizontal scales refer to vertical (Y-axis) and horizontal (X-axis) pixel positions in segment 7 4 (segment number 7 in the X direction and number 4 in the Y direction) of a greater printed image ("Reg" refers to "registered", that is, the digital representation of the printed image). A vertical scratch (defect) 508 is seen, located at pixel column 12.

FIG. 5B is a chart showing the projection signal 504 of the printed image in the segment shown in FIG. 5A and the projection signal 502 of the corresponding segment of the reference image, before they are registered (i.e. the signals are not aligned), in accordance with embodiments of the present invention. The X axis of the chart refers to pixel locations along the X axis of the segment shown in FIG. 5A, whereas the Y axis indicates the grey levels of the charted signals (the reference—Ref—signal and the Registered—Reg—signal).

A miscorrelation, in the form of peak 506 is evident, which is indicative of the existence of scratch 508 (FIG. 5A) in pixel column 12 (location 12 on the X axis).

Aspects of the present invention may be embodied as a computer program product saved on one or more non-transitory computer-readable mediums in the form of computer-readable program code embodied thereon. For example, the computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code of the above described embodiments of the invention may be written in any suitable programming language. The program code may execute on a single computer, or on a plurality of computers.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for detecting a scratch on a printed image, the method comprising:
   obtaining, by a computing device, a digital representation of the printed image and a digital reference image;
   summing, by the computing device, values of pixels of pixel lines in at least one segment of the digital representation of the printed image along a suspected direction to obtain a projection signal of the digital representation of the printed image for that segment, and summing values of pixels in a corresponding at least one segment of the digital reference image in the suspected direction to obtain a projection signal of the reference image for the corresponding segment; and
   comparing, by the computing device, the projection signals to detect dissimilarity indicative of a directional coherence in the suspected direction due to a scratch in said at least one segment of the digital representation of the printed image.

2. The method of claim 1, wherein the step of comparing the projection signals includes calculating a similarity measure between the projection signals and declare an existence of a directional coherence in the suspected direction due to a scratch when the similarity measure is below a predetermined threshold.

3. The method of claim 1, comprising scanning, by the computing device, the printed image to obtain the digital representation of the printed image.

4. The method of claim 1, comprising, by the computing device, applying a preprocessing operation on the digital representation of the printed image and on the digital reference image.

5. The method of claim 4, wherein the preprocessing operation is selected from a group of preprocessing operations consisting of reducing noise, increasing contrast, transforming the pair of corresponding segments a different domain and employing an extremity filter.

6. The method of claim 1, wherein the digital reference image includes one grey level or a few grey levels.

7. The method of claim 1, wherein said at least one segment comprises a plurality of segments and wherein said corresponding at least one segment includes a plurality of corresponding segments, the method including performing the steps of summing and comparing on each segment of the plurality of segments and a corresponding segment of the corresponding plurality of segments to detect dissimilarity indicative of a directional coherence in the suspected direction due to a scratch for each segment of said plurality of segments.

8. The method of claim 1, wherein the pixel lines comprise separated pixel lines.

9. The method of claim 1, wherein the pixel lines comprise adjacent pixel lines.

10. A non-transitory computer readable medium having stored thereon instructions which when executed by a processor cause the processor to:
   obtain a digital representation of the printed image and a digital reference image;
   sum values of pixels of pixel lines in at least one segment of the digital representation of the printed image along a suspected direction to obtain a projection signal of the digital representation of the printed image for that segment, and sum values of pixels in a corresponding at least one segment of the digital reference image in the suspected direction to obtain a projection signal of the reference image for the corresponding segment;
   compare the projection signals to detect dissimilarity indicative of a directional coherence in the suspected direction due to a scratch in said at least one segment of the digital representation of the printed image.

11. The non-transitory computer readable medium of claim 10, wherein the comparing the projection signals includes calculating a similarity measure between the projection signals and declare an existence of a directional coherence in the suspected direction due to a scratch when the similarity measure is below a predetermined threshold.

12. The non-transitory computer readable medium of claim 10, having instructions stored thereon which when executed by a processor cause the processor to scan the printed image to obtain the digital representation of the printed image.

13. The non-transitory computer readable medium of claim 10, having instructions stored thereon which when executed by a processor cause the processor to scan the printed image to apply a preprocessing operation on the digital representation of the printed image and on the digital reference image.

14. The non-transitory computer readable medium of claim 13, wherein the preprocessing operation is selected from a group of preprocessing operations consisting of reducing noise, increasing contrast, transforming the pair of corresponding segments a different domain and employing an extremity filter.

15. The non-transitory computer readable medium of claim 10, wherein said at least one segment comprises a plurality of segments and wherein said corresponding at least one segment includes a plurality of corresponding segments, the non-transitory computer readable medium having instructions stored thereon which when executed by a processor cause the processor to perform the steps of summing and comparing on each segment of the plurality of segments and a corresponding segment of the corresponding plurality of segments to detect dissimilarity indicative of a directional coherence in the suspected direction due to a scratch for each segment of said plurality of segments.

16. The non-transitory computer readable medium of claim 10, wherein the pixel lines comprise separated pixel lines.

17. The non-transitory computer readable medium of claim 10, wherein the pixel lines comprise adjacent pixel lines.

18. A system for detecting a scratch on a printed image, the system comprising:
   a segmenter for dividing a digital representation of a printed image and a digital reference image into a plurality of corresponding segments;
   a projector for summing values of pixels of pixel lines in at least one segment of the digital representation of the printed image along a suspected direction to obtain a projection signal of the digital representation of the printed image for that segment, and summing values of pixels in a corresponding at least one segment of the digital reference image in the suspected direction to obtain a projection signal of the reference image for the corresponding segment;
   a comparator for comparing the projection signals to detect dissimilarity indicative of a directional coherence in the suspected direction due to a scratch in said at least one segment of the digital representation of the printed image.

19. The system of claim 18, further including a scanner for scanning the printed image to obtain the digital representation of the printed image.

20. The system of claim 18, incorporated in a printer.

* * * * *